J. B. SULTZER.
Tablets of Coffee.
No. 214,011. Patented April 8, 1879.
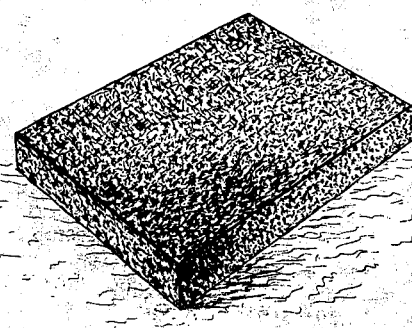
WITNESSES:
Henry N. Miller
C. Sedgwick
INVENTOR:
J. B. Sultzer
BY Munn & Co
ATTORNEYS.

UNITED STATES PATENT OFFICE.

JOSEPH B. SULTZER, OF NEW YORK, N. Y.

IMPROVEMENT IN TABLETS OF COFFEE.

Specification forming part of Letters Patent No. 214,011, dated April 8, 1879; application filed February 13, 1879.

*To all whom it may concern:*

Be it known that I, JOSEPH B. SULTZER, of New York, in the county and State of New York, have invented a new and Improved Tablet of Prepared Coffee, of which the following is a specification:

The drawing represents the tablet of prepared coffee.

This invention relates to an improved preparation of coffee, and has for its object to provide a solid compound of coffee in the tablet or stick form that is not liable to decomposition or deterioration in aroma or flavor.

To this end the invention consists in the combination, in a tablet or stick form, of milk, bicarbonate of soda, ground coffee, and sugar, in suitable proportions, as hereinafter specified, and from which a beverage can be readily prepared at the moment when desired.

In carrying out my invention I take a suitable quantity of milk, and heat the same until tepid, and add to it a proper amount of alkali. In the milk thus prepared I dissolve a suitable amount of sugar. The solution is then evaporated until it assumes a paste-like consistence, after which is added to it roasted and ground coffee in proper proportions; and after mixing the whole well, so as to thoroughly incorporate the ingredients, I form the compound into tablets while warm, which, upon cooling, become hard and are in condition for use.

The proportions of the ingredients may be modified to some extent, according to circumstances; but the following I have found to produce a compound answering well for general purposes, which I prepare as hereinafter set forth in detail: I take one-half part of condensed milk, or its equivalent in fresh milk or cream, and heat it in a suitable vessel until tepid. I then add to the same bicarbonate of soda, or other equivalent alkaline salt, in the proportion of fifty-two grains to each two pounds of milk. I then stir the milk briskly until it foams, after which I add one-fourth part of sugar, and boil the whole, stirring it constantly in the meantime, until it assumes the condition of a stiff paste. I then add one-fourth part of roasted and ground coffee, and thoroughly incorporate the whole by stirring, after which I form the mass into tablets in any convenient manner.

I am aware that tablets of coffee and sugar, and of coffee, sugar, and milk, are not new, and also that bicarbonate of soda has been added to milk before drying the same to a powder. Such, therefore, I do not claim. Nor do I claim anything described in the United States Letters Patent No. 48,268, for an extract of coffee, or the English Patent No. 509 of the year 1856, for a preparation of coffee-extracts.

What I do claim, however, is—

The improved coffee tablet or stick herein described, consisting of milk, bicarbonate of soda, ground coffee, and sugar, substantially in about the proportions stated.

JOSEPH B. SULTZER

Witnesses:
 WILTON C. DONN,
 C. SEDGWICK.